US 12,188,648 B2
(12) United States Patent
Kumon et al.

(10) Patent No.: US 12,188,648 B2
(45) Date of Patent: Jan. 7, 2025

(54) LIGHTING DEVICE FOR A STORAGE COMPARTMENT HAVING A COVER WITH DIFFUSE REFLECTIVE RECESSES AND EMISSION PROTRUSIONS

(71) Applicant: SHARP KABUSHIKI KAISHA, Sakai (JP)

(72) Inventors: Yui Kumon, Sakai (JP); Masaru Misumi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/038,299

(22) PCT Filed: Nov. 25, 2021

(86) PCT No.: PCT/JP2021/043148
§ 371 (c)(1),
(2) Date: May 23, 2023

(87) PCT Pub. No.: WO2022/114049
PCT Pub. Date: Jun. 2, 2022

(65) Prior Publication Data
US 2023/0408061 A1 Dec. 21, 2023

(30) Foreign Application Priority Data

Nov. 25, 2020 (JP) ................ 2020-195429

(51) Int. Cl.
*F21V 3/04* (2018.01)
*F21V 33/00* (2006.01)
(Continued)

(52) U.S. Cl.
CPC .......... *F21V 3/049* (2013.01); *F21V 33/0044* (2013.01); *F25D 27/00* (2013.01); *F21W 2131/305* (2013.01)

(58) Field of Classification Search
CPC .. G02B 6/0036; G02B 6/0048; G02B 6/0043; F25D 27/00; F21V 33/0044;
(Continued)

(56) References Cited

U.S. PATENT DOCUMENTS 5,961,198 A * 10/1999 Hira ..................... G02B 6/0036
362/621
5,980,054 A * 11/1999 Fukui ................... G02B 6/0061
362/625
(Continued)

FOREIGN PATENT DOCUMENTS

JP 05-3884 U 1/1993
JP 2008-089277 A 4/2008
(Continued)

Primary Examiner — Robert J May
(74) Attorney, Agent, or Firm — ScienBiziP, P.C.

(57) ABSTRACT

A larger amount of light generated by a light source is emitted to the interior of an accommodation chamber. A lighting device provided on a side wall of an accommodation chamber of a refrigerator includes a light source that generates light, and a cover including a light incident portion on which the light generated by the light source is incident. The cover includes a light exit portion that includes a protrusion formed at a front surface facing the interior of a storage compartment, and causes light to exit to the interior of the storage compartment, and a light reflection diffusion portion that is formed on the back side of the light exit portion at a back surface facing the light source side, includes a plurality of recesses each having an inner peripheral surface, and directs light toward the protrusion.

12 Claims, 14 Drawing Sheets

(51) Int. Cl.
*F25D 27/00* (2006.01)
*F21W 131/305* (2006.01)

(58) Field of Classification Search
CPC ....... F21W 2131/305; F21W 2131/307; B60Q 3/62; B60Q 3/64; B60Q 3/66
See application file for complete search history.

(56) References Cited

U.S. PATENT DOCUMENTS

| | | |
|---|---|---|
| 2004/0062031 A1 | 4/2004 | Pinter |
| 2008/0266879 A1* | 10/2008 | Chang .................. G02B 6/0021 362/330 |
| 2012/0106129 A1 | 5/2012 | Glovatsky et al. |
| 2020/0247314 A1* | 8/2020 | Abel ........................ B60Q 3/54 |
| 2021/0096427 A1* | 4/2021 | Yagi ..................... G02B 6/0036 |

FOREIGN PATENT DOCUMENTS

| | | |
|---|---|---|
| JP | 2012-099484 A | 5/2012 |
| JP | 2013-174382 A | 9/2013 |
| JP | 2014059067 A | 4/2014 |
| JP | 2014-186794 A | 10/2014 |
| JP | 2015-114005 A | 6/2015 |
| JP | 6001392 B2 | 10/2016 |

* cited by examiner

LIGHTING DEVICE FOR A STORAGE COMPARTMENT HAVING A COVER WITH DIFFUSE REFLECTIVE RECESSES AND EMISSION PROTRUSIONS

TECHNICAL FIELD

The present invention relates to a lighting device for a storage compartment, and to a storage compartment.

BACKGROUND ART

In recent years, attention has been focused on technologies that mimic and thereby utilize the diverse functions of organisms, that is, biomimetics. Nature Technology (trademark) is known as an example of manufacturing that employs such a biomimetic technology in, for example, electrical products.

PTL 1 discloses a refrigerator in which a lighting device provided at a front portion of a side wall of an accommodation chamber illuminates the accommodation chamber from the front side toward the rear. Such a lighting device includes a light source and a cover covering the light source. In recent years, LEDs and the like have been widely used as light sources. The cover includes a light incident portion on which light generated by the light source is incident. The light incident on the interior of the cover exits the cover toward the interior of the accommodation chamber. The cover plays a role of diffusing and then emitting directional light emitted from the light source such as the LED.

CITATION LIST

Patent Literature

PTL 1: JP 6001392 B

SUMMARY

Technical Problem

In the refrigerator disclosed in PTL 1, the light generated by the light source is diffused by the cover of the lighting device and emitted toward the interior of the accommodation chamber. However, in terms of emitting a larger amount of the light generated by the light source toward the interior of the accommodation chamber, there is still room for improvement.

An object of an aspect of the present invention is to provide a lighting device for a storage compartment capable of emitting, toward the interior of an accommodation chamber, a larger amount of light generated by a light source, and a storage compartment.

Solution to Problem

In order to solve the problem described above, a lighting device for a storage compartment according to an aspect of the present invention is a lighting device provided at a wall surface in an interior of a storage compartment. The lighting device includes a light source configured to generate light, and a cover including a light incident portion on which the light generated by the light source is incident. The cover includes a light exit portion including a protrusion formed at a front surface facing the interior of the storage compartment, the light exit portion being configured to cause light to exit to the interior of the storage compartment, and a light reflection diffusion portion formed on a back side of the light exit portion at a back surface facing a side of the light source, the light reflection diffusion portion including a plurality of recesses each having an inner peripheral surface, and being configured to direct light toward the protrusion.

In order to solve the problem described above, a storage compartment according to an aspect of the present invention includes a lighting device for a storage compartment according to an aspect of the present invention.

In order to solve the problem described above, a cover according to an aspect of the present invention is a cover provided in an interior of a storage compartment and including a light incident portion on which light emitted by a light source is incident. The cover includes a light exit portion including a protrusion formed at a front surface facing the interior of the storage compartment, the light exit portion being configured to emit light to the interior of the storage compartment, and a light reflection diffusion portion formed on a back side of the light exit portion at a back surface facing a side of the light source, the light reflection diffusion portion including a plurality of recesses each having an inner peripheral surface, and being configured to direct light toward the protrusion.

Advantageous Effects of Invention

According to an aspect of the present invention, a lighting device for a storage compartment capable of emitting, toward the interior of an accommodation chamber, a larger amount of light that is generated by a light source, and a storage compartment can be provided.

DESCRIPTION OF EMBODIMENTS

First Embodiment

An embodiment of the present invention will be described in detail below. In the present embodiment, a refrigerator is illustrated as an aspect of a storage compartment of the present disclosure, and a lighting device for the refrigerator is illustrated as a lighting device for the storage compartment. In addition, in the present embodiment, a configuration is illustrated in which the lighting device provided at a front portion of a side wall of an accommodation chamber of the refrigerator illuminates the rear side (a depth side) of the accommodation chamber.

Note that the embodiment disclosed herein is merely an example, and it is sufficient that a configuration be adopted in which an intended portion of the accommodation chamber is illuminated by a lighting device provided at a wall surface of the accommodation chamber. For example, a configuration may be adopted in which the rear side of the accommodation chamber is illuminated by a lighting device provided at a front portion of a wall surface of a ceiling of the accommodation chamber. Alternatively, a configuration may be adopted in which the upper side of the accommodation chamber is illuminated by a lighting device provided at a lower portion of a side wall of the accommodation chamber. Further, in addition to a refrigerator, the present invention can also be applied to, for example, a heating cooking apparatus including an accommodation chamber, such as a microwave oven or a convection microwave oven, and various types of storage compartments including an accommodation chamber.

Overview of Refrigerator 1

Figure 1:
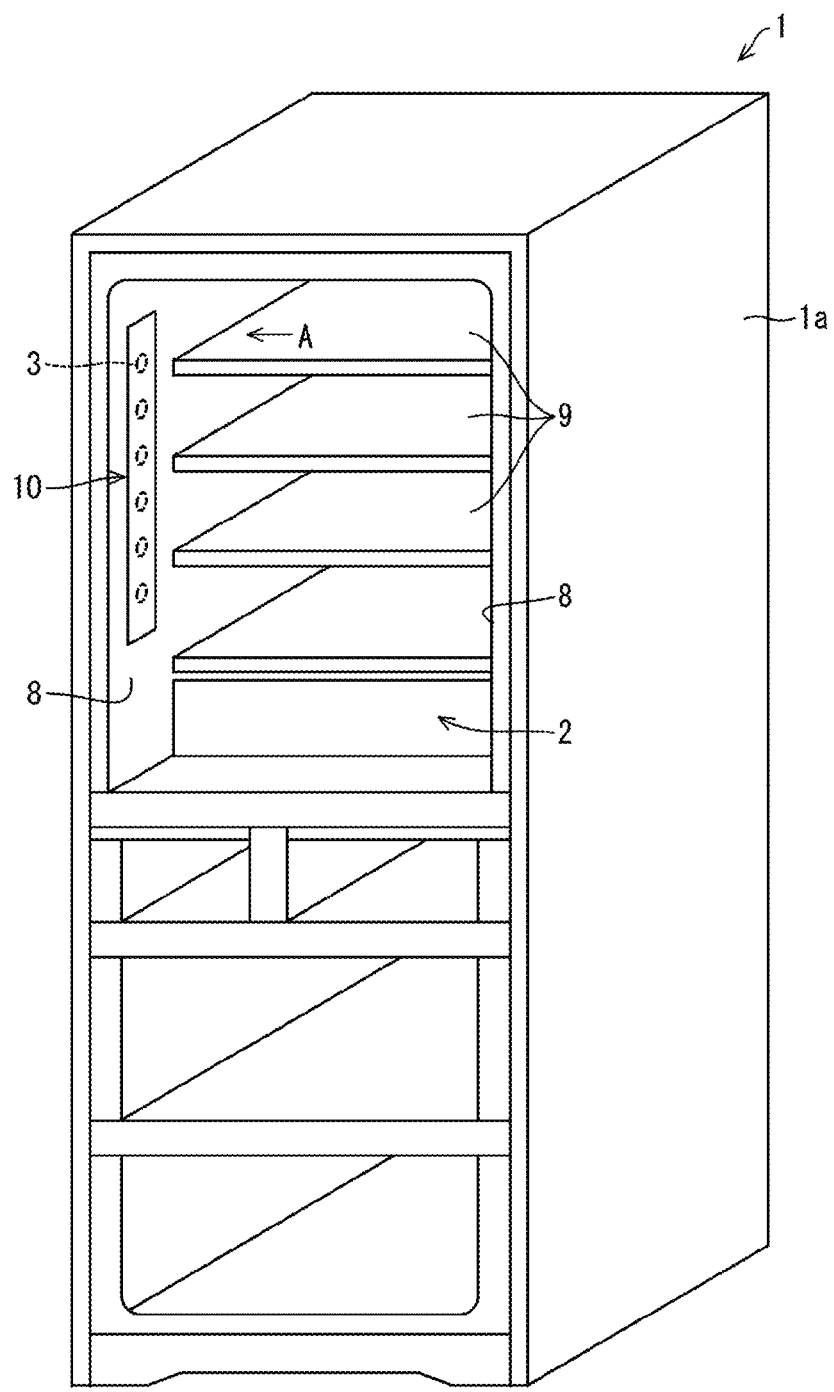
FIG. 1 is a perspective view illustrating a refrigerator according to a present embodiment.
Figure 2:
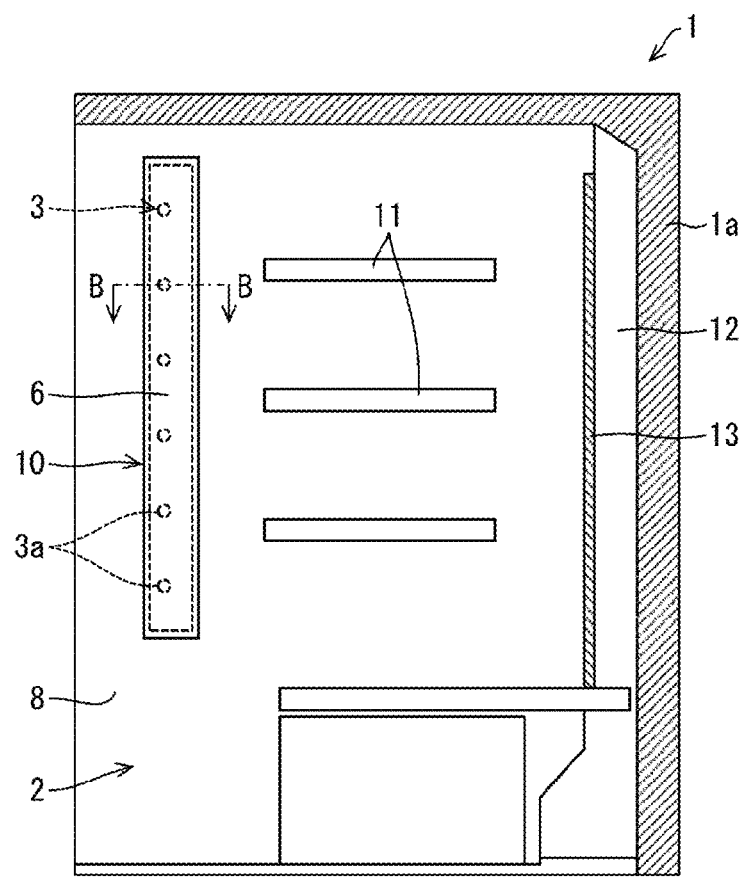
FIG. 2 is a view as viewed in the direction of an arrow A in FIG. 1.

FIG. 1 is a perspective view illustrating a refrigerator 1 according to the present embodiment. FIG. 2 is a view as viewed in the direction of an arrow A in FIG. 1. As illustrated in FIG. 1, the refrigerator 1 includes an accommodation chamber 2 defined by a heat insulating box 1*a* filled with a heat insulating material. Lighting devices 10 are provided at front portions of left and right side walls 8 of the accommodation chamber 2. As will be described in detail below, the lighting device 10 has an elongated shape that is long in the up-down direction and short in the front-rear direction.

As illustrated in FIG. 2, support portions 11 protrude from the left and right side walls 8, respectively. The support portions 11 support placement trays 9 on which objects to be stored are placed. The placement trays 9 are placed on the support portions 11 of the left and right side walls 8. A cool air passage 12, through which cool air circulates, is formed in a rear wall of the accommodation chamber 2. The cool air circulating through the cool air passage 12 is discharged into the accommodation chamber 2 via a discharge port (not illustrated). A front surface of the cool air passage 12 is covered by a metal panel 13, and cold energy of the cool air circulating through the cool air passage 12 is radiated into the accommodation chamber 2 via the metal panel 13. As a result, the interior of the accommodation chamber 2 can be uniformly cooled.

Overview of Lighting Device 10

Figure 3:
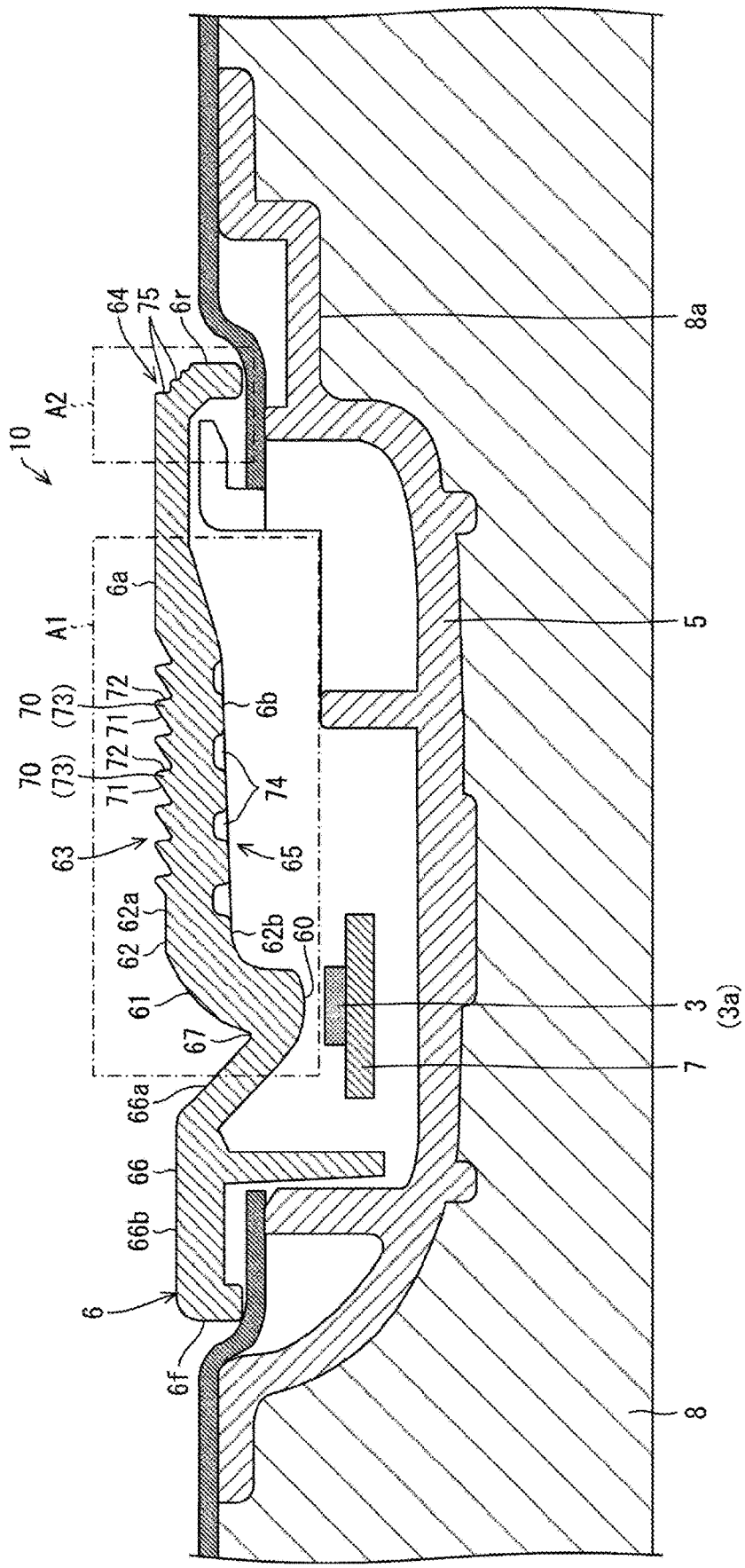
FIG. 3 is a cross-sectional view as viewed in the direction of arrows along a line B-B in FIG. 2.

FIG. 3 is a cross-sectional view as viewed in the direction of arrows along a line B-B in FIG. 2. As illustrated in FIG. 3, the lighting device 10 includes at least a light source 3 and a cover 6 covering the light source 3. The light source 3 emits light that illuminates the interior of the accommodation chamber 2. In the present embodiment, the light source 3 emits the light in a direction intersecting the side wall 8. Further, in the present embodiment, the light source 3 is constituted by a plurality of LEDs 3*a*, each having a chip-like shape, that are mounted side by side on a mounting substrate 7 having an elongated shape. The plurality of LEDs 3*a* are arranged side by side in the up-down direction.

The cover 6 includes, on a side opposing the light source 3, a light incident portion in which the light emitted by the light source 3 enters. Assuming that a surface of the cover 6 opposing the accommodation chamber 2 is a front surface 6*a* and a side opposite to the front surface 6*a* is a back surface 6*b*, in the present embodiment, the light incident portion 60 is provided at a position opposing the light source 3 at the back surface 6*b* of the cover 6. Further, in the present embodiment, a single cover 6 is provided covering all of the LEDs 3*a*, and the cover 6 is formed in the same elongated shape as that of the lighting device 10 (see FIG. 2). Note that it is sufficient that the cover 6 at least partially cover the light source 3.

The lighting device 10 is provided at the front portion of the side wall 8 of the accommodation chamber 2, and is attached to a recessed portion 8*a* formed in the side wall 8. A resin-molded case 5 is disposed in the recessed portion 8*a*. The mounting substrate 7 on which the plurality of LEDs 3*a* are mounted is attached to an inner side of the case 5, substantially parallel to the side wall 8. Note that the color of the case 5 is preferably a color that reflects light, such as white. As a result, light emitted from the back surface 6*b* of the cover 6 can be reflected, and caused to once again be incident from the back surface 6*b* of the cover 6.

The cover 6 covers an opening portion, of the case 5, that is open toward the accommodation chamber 2. The cover 6 is made of a transparent material such as an acrylic resin, glass, or a polystyrene resin. The cover 6 is fitted to close the case 5. The cover 6 includes a claw portion (not illustrated). When the claw portion is engaged with a hole portion (not illustrated) provided in the case 5, the cover 6 is latched onto the case 5.

Details of Cover 6

As illustrated in FIG. 3, the cover 6 includes the light incident portion 60, a first light guide portion 61, a second light guide portion 62, a light exit portion 63, an end portion light exit shape (light exit shape) 64, a light reflection diffusion portion 65, and a third light guide portion 66. Hereinafter, a configuration of the cover 6 will be described with reference to FIG. 3 to FIG. 12. Hereinafter, a front end portion of the cover 6 is referred to as a "front end portion 6*f*", and a rear end portion of the cover 6 is referred to as a "rear end portion 6*r*".

Figure 4:
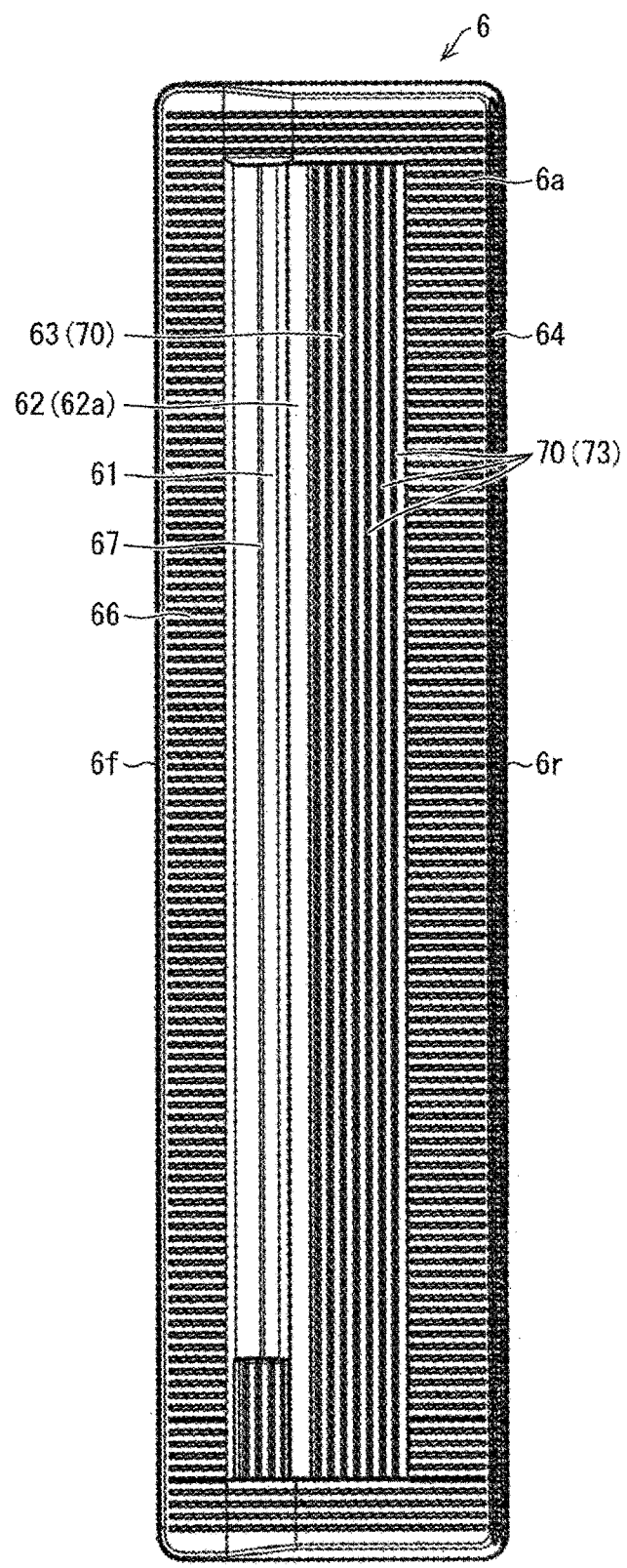
FIG. 4 is a front view illustrating a front surface side of a cover of a lighting device provided in an accommodation chamber of the refrigerator.
Figure 5:
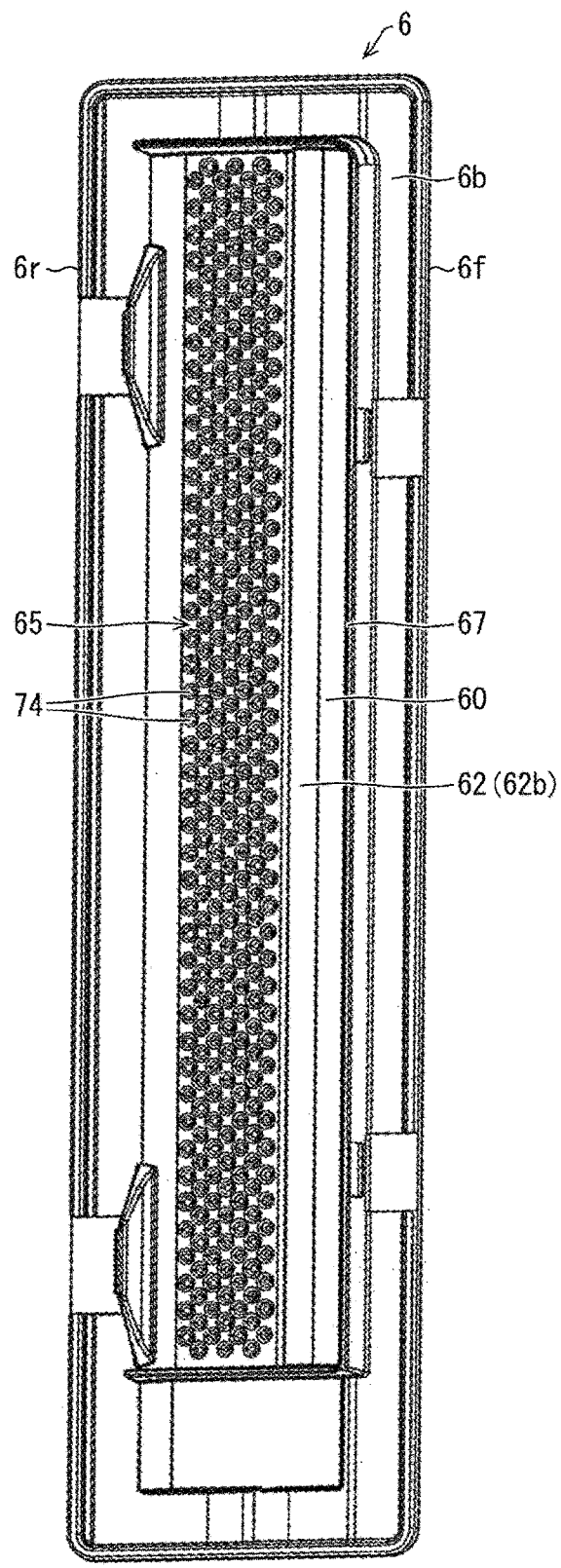
FIG. 5 is a rear view illustrating a back surface side of the cover.
Figure 6:
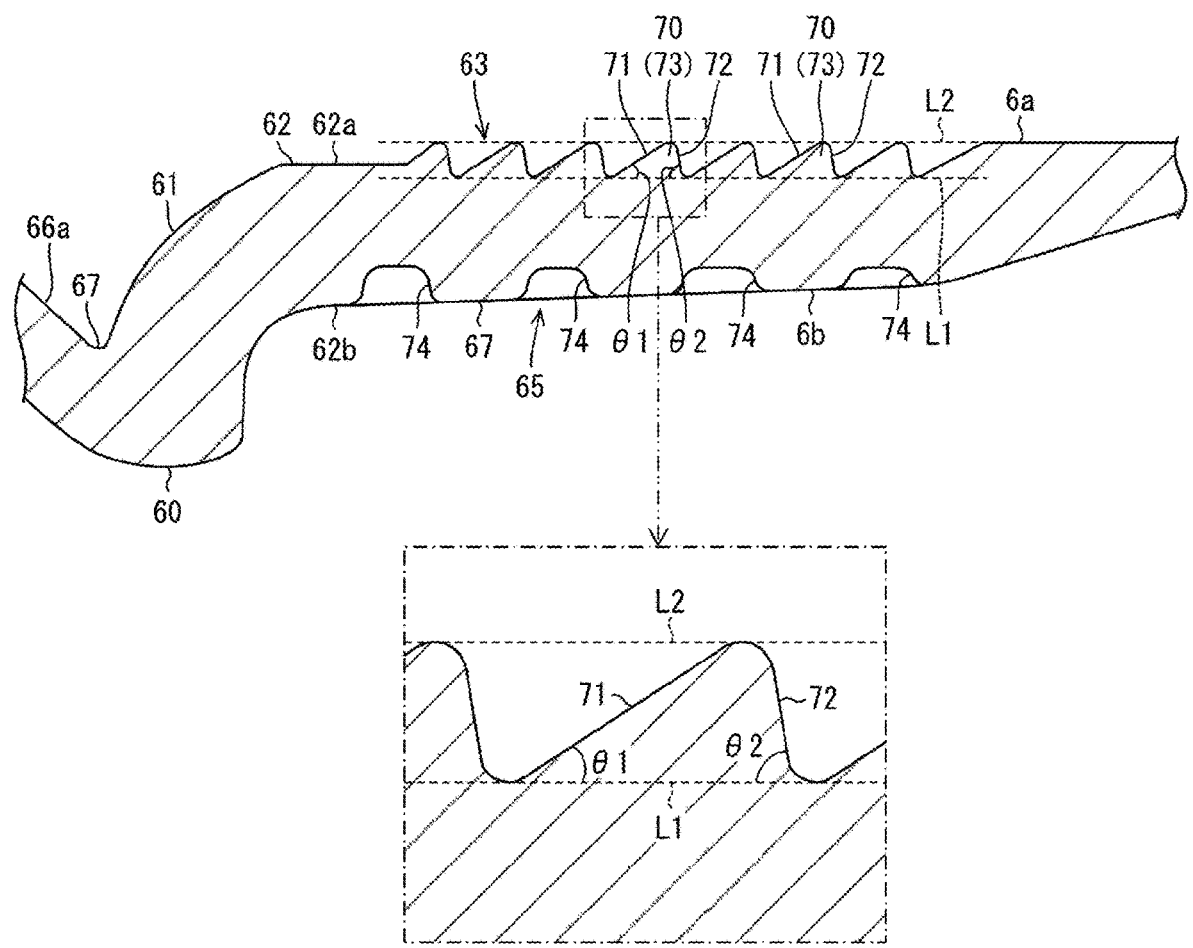
FIG. 6 is an enlarged view of a region A1 in FIG. 3.
Figure 7:
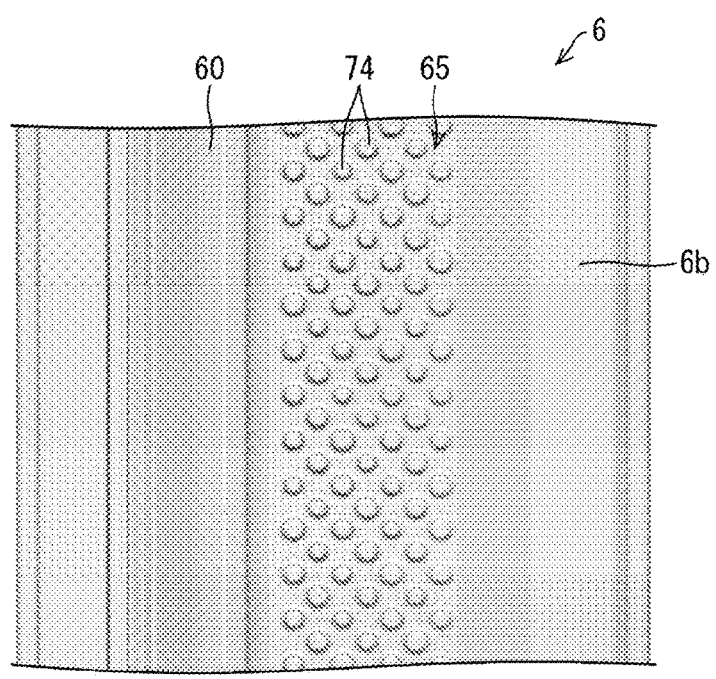
FIG. 7 is a diagram illustrating an example of an arrangement of recesses in a light reflection diffusion portion provided at the back surface of the cover.
Figure 8:
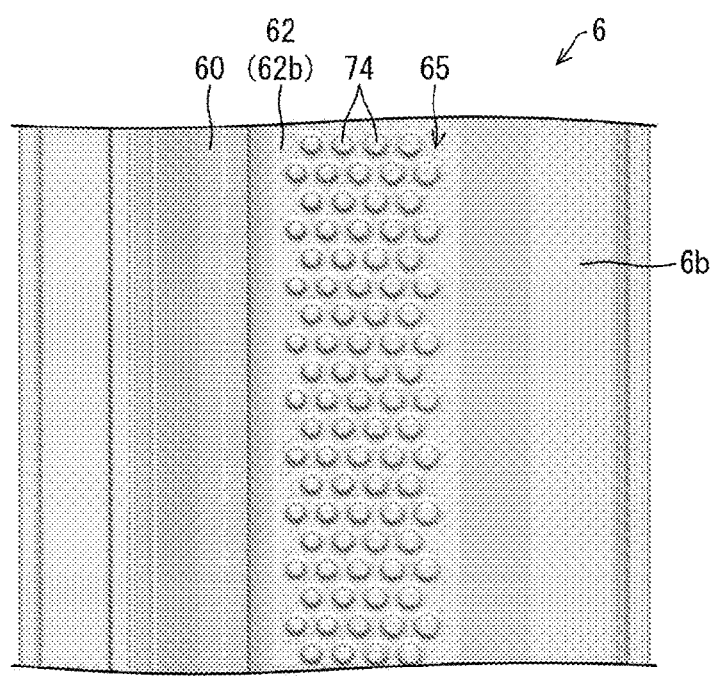
FIG. 8 is a diagram illustrating another example of the arrangement of the recesses in the light reflection diffusion portion provided at the back surface of the cover.
Figure 9:
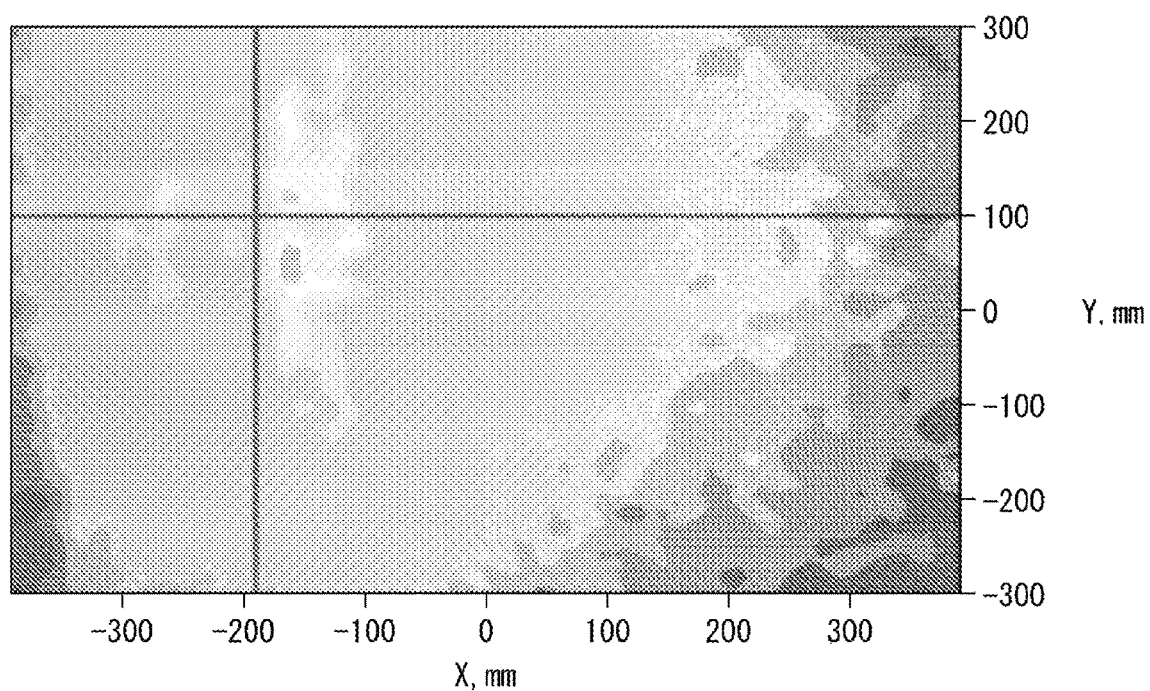
FIG. 9 is a diagram showing luminance measurement results in the arrangement example of the light reflection diffusion portion illustrated in FIG. 7.
Figure 10:
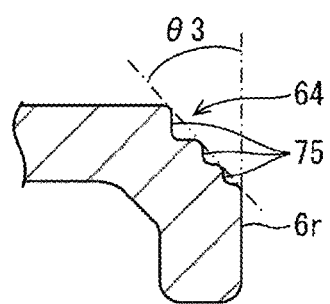
FIG. 10 is an enlarged view of a region A2 in FIG. 3.
Figure 11:
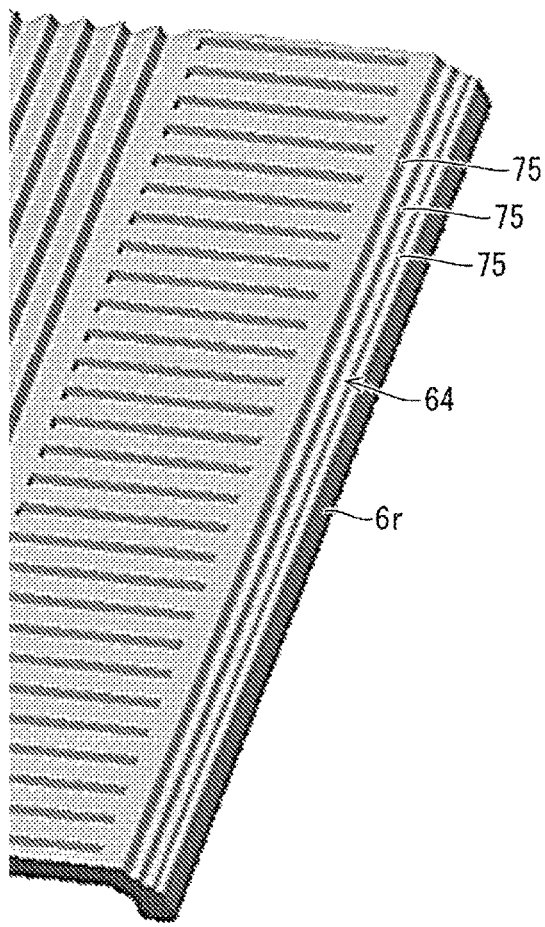
FIG. 11 is a diagram illustrating an example of an end portion light exit shape provided at a rear end portion, on the front surface side, of the cover.
Figure 12:
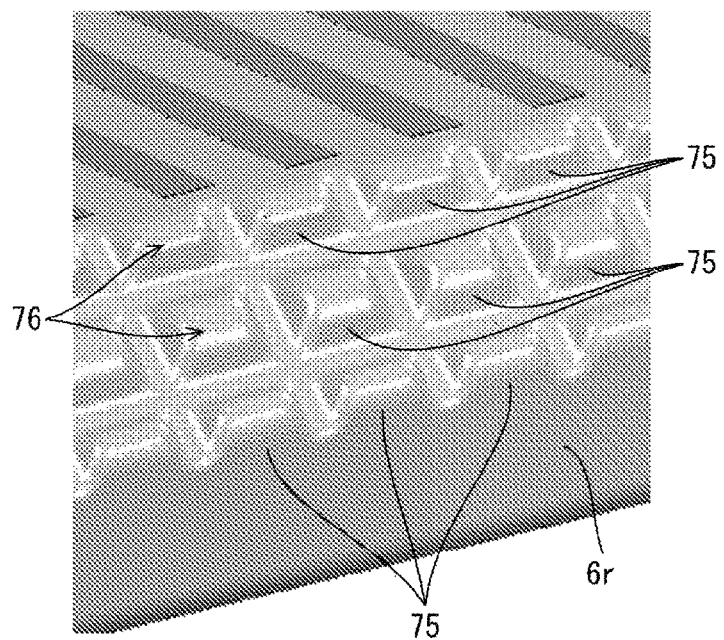
FIG. 12 is a diagram illustrating another example of the end portion light exit shape provided at the rear end portion, on the front surface side, of the cover.

FIG. 4 is a front view illustrating the front surface 6*a* side of the cover 6 of the lighting device 10 provided at the accommodation chamber 2 of the refrigerator 1. FIG. 5 is a rear view illustrating the back surface 6*b* side of the cover 6. FIG. 6 is an enlarged view of a region A1 in FIG. 3. FIG. 7 is a diagram illustrating an example of an arrangement of recesses 74 in the light reflection diffusion portion 65 provided at the back surface 6*b* of the cover 6. FIG. 8 is a diagram illustrating another example of the arrangement of the recesses 74 in the light reflection diffusion portion 65 provided at the back surface 6*b* of the cover 6. FIG. 9 is a diagram showing luminance measurement results in the arrangement example of the light reflection diffusion portion 65 illustrated in FIG. 7. FIG. 10 is an enlarged view of a region A2 in FIG. 3. FIG. 11 is a diagram illustrating an example of the end portion light exit shape 64 provided at the rear end portion 6r, on the front surface 6a side, of the cover 6. FIG. 12 is a diagram illustrating another example of the end portion light exit shape 64 provided at the rear end portion 6r, on the front surface 6a side, of the cover 6.

Light Incident Portion 60

The light incident portion 60 is a portion that takes the light generated by the light source 3 into the cover 6. The light incident portion 60 may be a portion on which the light generated by the light source 3 is incident in the direction along the side wall 8. As illustrated in FIG. 3, the light incident portion 60 corresponds to a surface, of the back surface 6b, opposing the light source 3. Further, in the present embodiment, as illustrated in FIG. 5, the light incident portion 60 is provided so as to extend long in the up-down direction, corresponding to the light source 3 in which the plurality of LEDs 3a are arranged side by side in the up-down direction. The light generated by the light source 3 (LEDs 3a) enters the interior of the cover 6 through the light incident portion 60.

First Light Guide Portion 61

The first light guide portion 61 is a portion that changes the travel direction of light incident from the light incident portion 60 to a first direction along the wall surface of the accommodation chamber 2. The first light guide portion 61 changes the travel direction of the incident light to the first direction, by reflecting the incident light. As described above, in the present embodiment, the lighting device 10 provided at the front portion of the side wall 8 of the accommodation chamber 2 illuminates the rear side of the accommodation chamber 2. Thus, the first light guide portion 61 changes the travel direction of the light incident from the light incident portion 60 to a direction from the front (front side) to the rear (depth side) along the wall surface of the accommodation chamber 2. This direction from the front to the rear is the first direction.

As illustrated in FIG. 3 and FIG. 6, in the present embodiment, the first light guide portion 61 is formed by a curved surface over which the front surface 6a side, which corresponds to a portion at which the light incident portion 60 is located, protrudes toward the inner side of the accommodation chamber 2 and curves toward the rear. The first light guide portion 61 as described above is formed by a curved surface inclined at a predetermined angle relative to the light incident portion 60. Note that, although the first light guide portion 61 is a curved surface in the example illustrated in FIG. 3, the first light guide portion 61 may be a flat surface inclined at a predetermined angle relative to the light incident portion 60.

The first light guide portion 61 is preferably inclined so that light emitted from the LEDs 3a and incident from the light incident portion 60 is incident on the first light guide portion 61 at an angle larger than a critical angle. For example, when the cover 6 is made of an acrylic resin, the critical angle of light incident from the acrylic resin toward the air is approximately 42 degrees. Thus, it is preferable that the first light guide portion 61 be inclined so that the light incident from the light incident portion 60 is incident on the first light guide portion 61 at an angle larger than the critical angle of approximately 42 degrees. When the first light guide portion 61 is inclined in this manner, most of the light emitted from the LEDs 3a and incident from the light incident portion 60 can be reflected (totally reflected) without being made to exit from the first light guide portion 61 to the outside, and be sent (guided) toward the rear side (to the rear end portion 6r side).

Second Light Guide Portion 62

The second light guide portion 62 is a portion that is located between the first light guide portion 61 and the light exit portion 63, and guides the light from the first light guide portion 61 to the light exit portion 63. At the second light guide portion 62, a smaller amount of light (exit amount) exits to the accommodation chamber 2 than at the light exit portion 63.

By providing the second light guide portion 62 as described above between the first light guide portion 61 and the light exit portion 63, the position of the light exit portion 63 naturally moves downstream in the travel direction of the light traveling from the front to the rear. As a result, the light generated by the light source 3 can be more effectively utilized by more effectively illuminating the rear side of the accommodation chamber 2, which is the intended portion of the accommodation chamber 2, using the lighting devices 10 provided at the side walls 8 of the accommodation chamber 2.

In the present embodiment, at least a second light guide portion front surface 62a has a planar shape. As a result, diffusion of light at the second light guide portion front surface 62a is suppressed, and a larger amount of light can be sent to the rear side without the light exiting from the second light guide portion front surface 62a to the outside. More preferably, a second light guide portion back surface 62b also has a planar shape. As a result, diffusion of light at the second light guide portion back surface 62b is suppressed, and a larger amount of light can be sent to the rear side without the light exiting from the second light guide portion back surface 62b to the outside.

The second light guide portion front surface 62a has a smaller surface roughness than that of the light exit portion 63. As a result, diffusion of light at the second light guide portion front surface 62a is suppressed, and a larger amount of light can be sent to the rear without the light exiting to the outside. More preferably, the second light guide portion back surface 62b also has a smaller surface roughness than that of the light exit portion 63. As a result, diffusion of light at the second light guide portion back surface 62b is suppressed, and a larger amount of light can be sent to the rear without the light exiting to the outside.

Here, with respect to the second light guide portion 62, the light incident on the second light guide portion 62 from the first light guide portion 61 is preferably incident on the second light guide portion front surface 62a located at the front surface 6a or the second light guide portion back surface 62b located at the back surface 6b at an angle larger than the critical angle. With this configuration, most of the light incident from the first light guide portion 61 can be totally reflected between the second light guide portion front surface 62a and the second light guide portion back surface 62b, and can be sent to the rear side without the light exiting from the first light guide portion 61 to the outside.

Thus, in the present embodiment, at least the second light guide portion front surface 62a is parallel (substantially parallel) to the direction from the front to the rear (first direction), which is the travel direction of the light changed by the first light guide portion 61. As a result, the light incident from the first light guide portion 61 can be totally reflected at the second light guide portion front surface 62a. More preferably, the second light guide portion back surface 62b is also parallel (substantially parallel) to the travel direction of the light changed by the first light guide portion 61. As a result, the light incident from the first light guide portion 61 can also be totally reflected at the second light guide portion back surface 62b. Further, since both the second light guide portion front surface 62a and the second light guide portion back surface 62b are provided in parallel with the light incident portion 60, even if the second light guide portion 62 is relatively long in the front-rear direction, the light guided by the second light guide portion 62 can be totally reflected and sent to the rear side.

In the present embodiment, as illustrated in FIG. 6, the second light guide portion 62 is located so as to be recessed more deeply toward the wall core side of the side wall 8 than the front surface 6a, which is the portion of the cover 6 protruding furthest to the inner side of the accommodation chamber 2. In other words, the second light guide portion front surface 62a is located so as to be recessed more deeply toward the wall core side of the side wall 8 than the front surface 6a, which is the portion of the cover 6 protruding furthest to the inner side of the accommodation chamber 2. Here, it is more preferable that the second light guide portion 62 be located so as to be recessed more deeply toward the wall core side of the side wall 8 than the side wall 8. In other words, the second light guide portion 62 is recessed from the side wall 8. As a result, protrusion of the second light guide portion 62 into the accommodation chamber 2 can be reduced, and it is less likely for the second light guide portion 62 to come into contact with the placement tray 9 (see FIG. 1) or the like installed in the accommodation chamber 2.

Third Light Guide Portion 66

The third light guide portion 66 is provided on the front surface 6a of the cover 6, so as to be closer to the front end portion 6f than the first light guide portion 61. The third light guide portion 66 is a portion that guides the light incident from the light incident portion 60 to the front side (front end portion 6f side). The third light guide portion 66 has an inclined surface 66a extending further to the inner side of the accommodation chamber 2 than a portion corresponding to a front end portion of the light incident portion 60, and a flat surface 66b continuous with the inclined surface 66a. The inclined surface 66a is connected to the first light guide portion 61. An intersection line 67 at which the first light guide portion 61 and the inclined surface 66a intersect is arranged so as to be biased toward the front side relative to the center of the light incident portion 60 in the front-rear direction. With this configuration, the front end portion 6f side of the cover 6 can also be illuminated by the light from the light source 3.

Similarly to the second light guide portion 62, it is preferable that the flat surface 66b of the third light guide portion 66 be recessed from the side wall 8. With this configuration, protrusion of the flat surface 66b into the accommodation chamber 2 can be reduced, and it is less likely for the flat surface 66b to come into contact with the placement tray 9 (see FIG. 1) or the like installed in the accommodation chamber 2.

Light Exit Portion 63

The light exit portion 63 is a portion at which most of the light, which is incident into the interior of the cover 6, emits to the accommodation chamber 2. The light incident portion 60 is provided on the front surface 6a of the cover 6. As illustrated in FIG. 3 and FIG. 6, in the present embodiment, the light exit portion 63 is located downstream of the first light guide portion 61 in the travel direction of the light traveling from the front to the rear. Further, the light exit portion 63 is provided further to the rear side (depth side) of the accommodation chamber 2 than the second light guide portion 62.

As illustrated in FIG. 6, the light exit portion 63 includes protruding portions 70 formed on the front surface 6a of the cover 6. Each protruding portion 70 has a first surface 71 and a second surface 72 along the direction from the front to the rear, which is the first direction. When an internal angle formed between the first surface 71 and a line segment L1 is $\theta 1$ and an internal angle formed between the second surface 72 and the line segment L1 is $\theta 2$, $\theta 2 > \theta 1$. The line segment L1 indicates a plane parallel to the side wall 8. The line segment L1 is also parallel to the front side 6a of the cover 6. In FIG. 6, the outline of the front surface 6a of the cover 6 is indicated by a line segment L2.

By providing the protruding portion 70 having the first surface 71 and the second surface 72 on the front surface 6a side of the cover 6 as the light exit portion 63, the light can effectively be made to exit from the front surface 6a side of the cover 6. As a result, a larger amount of light generated by the light source 3 can be made to exit to the interior of the accommodation chamber 2.

Here, the first surface 71 is a surface facing upstream in the travel direction of the light traveling from the front to the rear, and the second surface 72 is a surface facing downstream in the travel direction of the light traveling from the front to the rear. Since the second surface 72 faces downstream in the travel direction of the light traveling from the front to the rear, the light that has exited from the second surface 72 turns into light traveling toward the rear side of the accommodation chamber 2, and the light can be sent exclusively toward the rear side of the accommodation chamber 2. As a result, the rear side of the accommodation chamber 2 can be illuminated with a high illuminance. Note that, since the first surface 71 faces upstream in the travel direction of the light traveling from the front to the rear, light traveling from the front to the rear is unlikely to exit from the first surface 71.

In the present embodiment, a plurality of the first surfaces 71 and the second surfaces 72 as described above are alternately arranged along the direction from the front to the rear. By adopting such a configuration, a plurality of light beams can exit from the light exit portion 63 toward the rear side of the accommodation chamber 2. Further, the light exiting from the second surface 72 located closer to the front side can illuminate the center, in the left-right direction, of the rear side of the accommodation chamber 2, and the light exiting from the second surface 72 located closer to the rear side can illuminate end portions, in the left-right direction, of the rear side of the accommodation chamber 2. As a result, the rear side of the accommodation chamber 2 can be illuminated over a wide range.

In the present embodiment, the protruding portion 70 includes a plurality of protrusions 73 each having a triangular cross-sectional shape along the direction from the front to the rear. Of two inclined surfaces of the protrusion 73, the inclined surface located upstream in the travel direction of the light traveling from the front to the rear is the first surface 71, and the inclined surface located downstream in the travel direction of the light is the second surface 72. By adopting such a configuration, the first surfaces 71 and the second surfaces 72 can be densely formed on the front surface 6a of the cover 6.

Further, in the present embodiment, the plurality of protrusions 73 are provided continuously in the direction from the front to the rear. In other words, the plurality of protrusions 73 are provided continuously without any gap in the direction from the front to the rear. As a result, the light exiting the light exit portion 63 toward the rear side of the accommodation chamber 2 is not interrupted in the direction from the front to the rear, suppressing unevenness in brightness when the rear side of the accommodation chamber 2 is illuminated.

As illustrated in FIG. 4, in the present embodiment, each of the protrusions 73 is provided in a line extending in a direction intersecting the direction from the front to the rear. As a result, the front surface 6a of the cover 6 can be easily cleaned by pressing a wet cloth or the like against the plurality of protrusions 73 and moving the wet cloth or the like in the direction in which the line of protrusions 73 extends.

In particular, in the present embodiment, since the cover 6 is elongated (has an elongated shape) so as to be long in the up-down direction and short in the front-rear direction, the line extending in the direction intersecting the direction from the front to the rear is a line extending in the longitudinal direction of the cover 6. Therefore, when a wet cloth or the like is moved in the direction in which the line extends, the whole front surface 6a of the cover 6 can be cleaned at the same time in the longitudinal direction, and cleaning can be performed more easily. In this case, the first direction is the lateral direction.

Further, from the viewpoint of ease of cleaning, the height of each of the protrusions 73 is preferably equal to or less than 2 mm. Further, the apex of each protruding portion 70 is preferably rounded.

The plurality of protrusions 73 may include protrusions 73 having mutually different sizes. Varying the sizes of the protrusions 73 makes it possible to vary the sizes of the light beams exiting the second surface 72 at different locations. As a result, the amount of light exiting the light exit portion 63 can be changed. For example, by making the protrusions 73 located closer to the rear side separated from the light source 3 larger than the protrusions 73 located closer to the front side in the vicinity of the light source 3, the light from the light source 3 can be more effectively sent to the rear side of the accommodation chamber 2.

Further, the internal angle θ2 formed by the second surface 72 and the line segment L1 is preferably from 90 degrees to 50 degrees. By setting the upper limit of the internal angle θ2 to 90 degrees, the light exiting the second surface 72 can be directed toward the rear side of the accommodation chamber 2 along the side wall 8. If the upper limit of the internal angle θ2 is larger than 90 degrees, the light exiting the second surface 72 is directed to the side wall 8 side instead of the interior of the accommodation chamber 2, which increases the amount of light that is not effectively utilized. By setting the lower limit of the internal angle θ2 to 50 degrees, the light exiting the second surface 72 can be directed toward the rear side of the accommodation chamber 2. If the lower limit of the internal angle θ2 is smaller than 50 degrees, an extent of protrusion of the protrusion increases, which negatively affects ease of cleaning. In the present embodiment, the internal angle θ2 is set to 80 degrees.

Further, the internal angle θ1 formed by the first surface 71 and the line segment L1 is preferably larger than 0 degrees and smaller than 90 degrees, and more preferably smaller than 45 degrees. By setting the internal angle θ1 to an angle smaller than 45 degrees, light is easily guided (easily directed) to the rear side of the accommodation chamber 2.

Note that, in the present embodiment, a configuration is illustrated as an example in which the light exit portion 63 including the protruding portions 70 is provided as the light exit portion 63 of the cover 6 provided with the first light guide portion 61 and the second light guide portion 62.

However, the light exit portion 63 need only be formed at a surface (front surface), of the cover 6 including the light incident portion 60, opposing the accommodation chamber 2.

Further, in the present embodiment, as illustrated in FIG. 6, a valley formed between adjacent protrusions 73 is formed to be deeper than the second light guide portion front surface 62a.

Light Reflection Diffusion Portion 65

The light reflection diffusion portion 65 is a portion that sends light guided inside the cover 6 to the front surface 6a side, by reflecting and diffusing the light. As illustrated in FIG. 5 and FIG. 6, the light reflection diffusion portion 65 is provided on the back surface 6b of the cover 6. The light reflection diffusion portion 65 includes a plurality of recesses 74 provided on the back surface 6b of the cover 6. The plurality of recesses 74 diffuse the light guided inside the cover 6, and reflect the light toward the front surface 6a side. As a result, compared with a configuration in which the back surface 6a of the cover 6 is formed by a flat surface, the guided light can be diffused and reflected before being sent to the front surface 6b side.

Since the guided light is reflected by the inner peripheral surface of each of the recesses 74, light is less likely to exit to a space inside the recess 74. Further, even after the light exits to the space inside the recess 74, the light is likely to exit again from the inner peripheral surface of the recess 74. As a result, a larger amount of light can be directed toward the front surface 6a side.

In the present embodiment, the light exit portion 63 is provided on the front surface 6a side of the cover 6 corresponding to the light reflection diffusion portion 65. In other words, the plurality of recesses 74 are located on the back side of the light exit portion 63. Thus, a larger amount of light can be made to exit from the light exit portion 63 toward the accommodation chamber 2, and the light of the light source 3 can be effectively utilized.

Furthermore, in the present embodiment, the recesses 74 are also formed at an end portion, of the second light guide portion 62, closer to the light exit portion 63. In other words, the plurality of recesses 74 are also provided at a rear portion of the second light guide portion 62 (a portion adjacent to the boundary with the light exit portion 63), and are distributed so as to include a rear portion of the second light guide portion back surface 62b. As a result, light guided from the rear portion of the second light guide portion 62 can be diffused and reflected before being sent to the front surface 6a side, and the light can also be effectively emitted from a front portion of the light exit portion 63 (a portion close to the boundary with the second light guide portion 62).

Further, the inner peripheral surface of each of the recesses 74 is preferably a curved surface. By forming the inner peripheral surface as a curved surface, the guided light is more easily reflected by the inner peripheral surface and becomes less likely to exit from a space inside the recess. Further, the light guided by the curved inner peripheral surface can be more effectively diffused.

As an example of the recess 74 having an inner peripheral surface that is a curved surface, a configuration may be adopted in which the recess 74 is circular when viewed from the back surface 6b of the cover 6. In that case, the recess 74 may have a hemispherical or dome-like shape. By forming the recess 74 in a hemispherical or dome-like shape, light can be diffused more effectively.

The plurality of recesses 74 may include recesses 74 having mutually different sizes. Varying the sizes of the recesses 74 makes it possible to vary the amount of light diffused and reflected at different locations. In other words, a diffusion degree of the light exiting the front surface 6a of the cover 6, that is, the light exiting the light exit portion 63 in the present embodiment can be changed. As a result, localized light can be softened, and unevenness in the brightness can be reduced.

The plurality of recesses 74 may include recesses 74 having mutually different depths. Similarly to the size, changing the depth of the recesses makes it possible to vary the amount of diffused and reflected light at different locations.

When varying the depths of the recesses 74, the back surface 6b of the cover 6 may be provided so as to gradually approach the front surface 6a of the cover 6 further downstream in the travel direction of the light traveling from the front to the rear. As a result, it is possible to easily create a configuration in which the depths of the recesses 74 become gradually shallower from upstream to downstream in the travel direction of the light traveling from the front to the rear.

Further, as illustrated in FIG. 7, the plurality of recesses 74 are preferably arranged in a staggered manner. By arranging the recesses 74 in a staggered manner, more of the recesses 74 can be arranged per unit area, and the recesses 74 can be densely formed.

Further, when arranging the recesses 74 in a staggered manner, as illustrated in FIG. 8, it is more preferable to arrange the recesses 74 so that the edge-to-edge distance between adjacent recesses 74 is equal to or less than the diameter of each recess 74. With this configuration, even in the same staggered arrangement, the recesses 74 can be formed more densely than in the arrangement illustrated in FIG. 7. Further, from the viewpoint of densely arranging the recesses 74, regardless of the staggered arrangement, it is more preferable to arrange the recesses 74 so that the edge-to-edge distance between adjacent recesses 74 is equal to or less than the diameter of each recess 74.

When luminance was measured while changing the number of the recesses 74 with the front surface 6a of the cover 6 formed as a flat surface, it was confirmed that unevenness of brightness (unevenness in luminance) was reduced by increasing the number of the recesses 74 and densely arranging the recesses 74. Also, from FIG. 9 which shows the luminance measurement results when the arrangement of the light reflection diffusion portion 65 is set to the arrangement illustrated in FIG. 7, it can be confirmed that the unevenness of brightness is small. FIG. 9 shows the luminance at the rear surface of the accommodation chamber 2, when the LEDs 3a are arranged at the front portion of the side wall 8 to illuminate the rear surface of the accommodation chamber 2 (depth-side surface inside the compartment). Further, the intersection point in FIG. 9 indicates the height position of the LED 3a.

Note that, in the present embodiment, a configuration is illustrated as an example in which the light reflection diffusion portion 65 of the cover 6 provided with the first light guide portion 61 and the second light guide portion 62 has a configuration in which the plurality of recesses 74 are provided on the back surface 6b of the cover 6, and light is reflected while being diffused toward the front surface 6a of the cover 6. However, it is sufficient that the light reflection diffusion portion 65 be formed on a surface opposing the back surface, on the light source 3 side, of the cover covering at least a part of the light source 3.

End Portion Light Exit Shape 64

As illustrated in FIG. 3, FIG. 10, and FIG. 11, the end portion light exit shape 64 is provided at the rear end portion 6r. The rear end portion 6r is an end portion located further downstream in the travel direction of the light traveling from the front to the rear than the light exit portion 63, and protrudes from the side wall 8 toward the inner side of the accommodation chamber 2. Then, as illustrated in FIG. 10, the end portion light exit shape 64 has a light exit surface 75 facing downstream in the travel direction of the light traveling from the front to the rear.

By providing the end portion light exit shape 64 at the rear end portion 6r, light having reached the rear end portion 6r without exiting the light exit portion 63 can be made to exit from the light exit surface 75 toward the rear side of the accommodation chamber 2. As a result, the light generated by the light source 3 can be more effectively utilized by more effectively illuminating the rear side of the accommodation chamber 2, which is the intended portion of the accommodation chamber 2, using the lighting devices 10 provided on the side walls 8 of the accommodation chamber 2.

As illustrated in FIG. 10, the light exit surface 75 as described above may be divided into a plurality of stages (three stages in FIG. 10). Further, as illustrated in FIG. 11, the light exit surface 75 may be provided in a line extending in a direction intersecting the direction from the front to the rear. When the light exit surface 75 is provided in a line shape, light can exit without interruption in the direction in which the line extends, and unevenness in the brightness can be suppressed.

In particular, in the present embodiment, since the cover 6 has the elongated shape long in the up-down direction and short in the front-rear direction, the line extending in the direction intersecting the direction from the front to the rear is a line extending in the longitudinal direction. Therefore, when a wet cloth or the like is moved in the direction in which the line extends, the whole front surface 6a of the cover 6 can be cleaned at the same time in the longitudinal direction, and cleaning can be performed more easily.

Further, as illustrated in FIG. 3, in the present embodiment, the rear end portion side 6r of the cover 6 is inclined so as to gradually approach the side wall 8 further downstream in the travel direction of the light traveling from the front to the rear, and a plurality of the light exit surfaces 75 each having a line shape are provided at the inclined surface of the rear end portion side 6r.

Since the inclined surface of the rear end portion 6r diagonally faces the rear side of the accommodation chamber 2, light emitted diagonally toward the rear side of the accommodation chamber 2 can be increased. As a result, a central portion, in the left-right direction, of the rear side of the accommodation chamber 2 can be illuminated. In the present embodiment, an inclination angle θ3 of the inclined surface of the rear end portion 6r illustrated in FIG. 10 is 45 degrees, forming a so-called C surface, but no limitation is intended.

Further, as illustrated in FIG. 12, the end portion light exit shape 64 may be a plurality of rectangular block shapes 76 provided on the inclined surface of the rear end portion 6r. Each rectangular block shape 76 forms a protrusion toward the normal direction of the inclined surface of the rear end portion 6r, and the light exit surface 75 is provided in the rectangular block shape 76.

The plurality of rectangular block shapes 76 may include rectangular block shapes 76 having mutually different sizes. Varying the sizes of the rectangular block shapes 76 makes it possible to vary the amount of light emitted from the rear end portion 6r at different locations. As a result, since the amount of light exiting the rear end portion 6r can be changed, localized light can be softened, and unevenness in the brightness can be reduced.

Exit of Light Traveling Inside Cover 6

Figure 13:
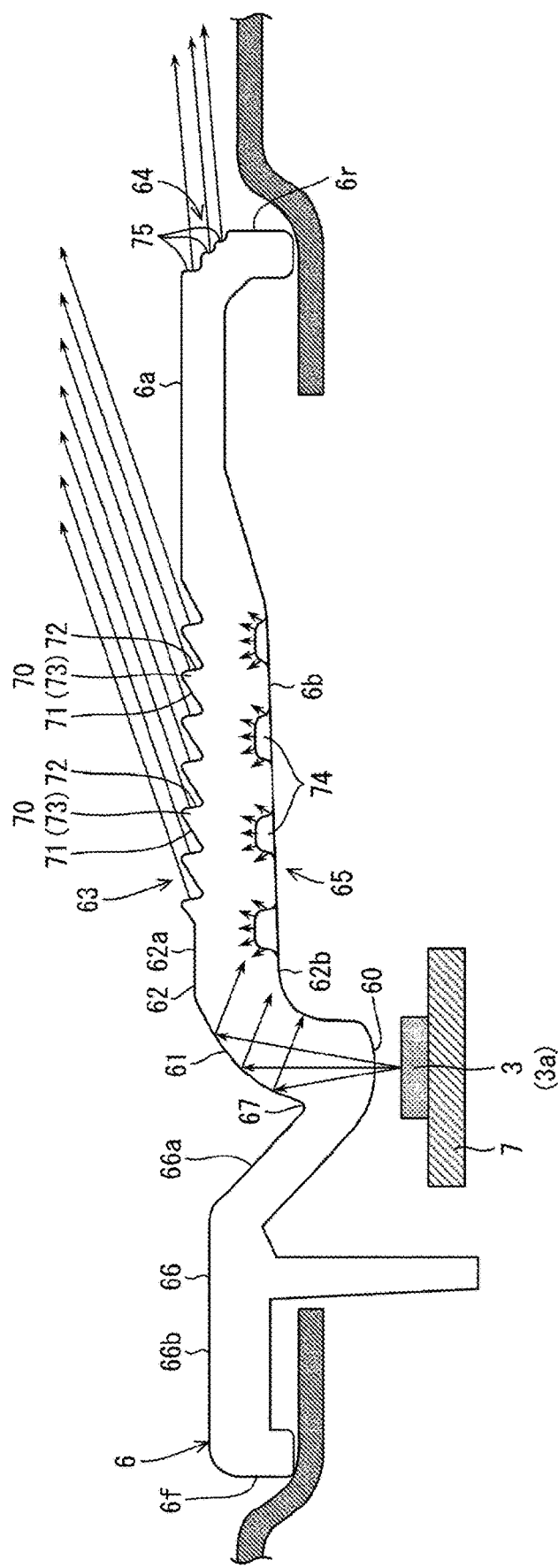
FIG. 13 is a diagram illustrating an example of light that travels inside the cover exiting the cover.

FIG. 13 is a diagram illustrating an example of light that travels inside the cover 6 exiting the cover 6. As illustrated in FIG. 13, the light generated by the LEDs 3a of the light source 3 is incident into the interior of the cover 6 through the light incident portion 60, is reflected by the first light guide portion 61, and the travel direction thereof is changed to the direction from the front to the rear.

Note that, although not illustrated, some of the light incident into the interior of the cover 6 from the light incident portion 60 is reflected by the inclined surface 66a of the third light guide portion 66, and the travel direction thereof is changed to the direction from the rear to the front. However, since the intersection line 67 between the first light guide portion 61 and the inclined surface 66a is biased toward the front side relative to the center of the light incident portion 60 in the front-rear direction, most of the light having entered the cover 6 from the light incident portion 60 is reflected by the first light guide portion 61. Further, of the light incident into the cover 6 from the light incident portion 60, the light that has reached the first light guide portion 61 and the inclined surface 66a at an incident angle smaller than the critical angle, despite being a small amount, exits from the first light guide portion 61 and the inclined surface 66a, toward the interior of the accommodation chamber 2.

The light whose travel direction has been changed by the first light guide portion 61 is guided to the second light guide portion 62. The light guided to the second light guide portion 62 is reflected by the second light guide portion front surface 62a or the second light guide portion back surface 62b, or is reflected between the second light guide portion front surface 62a and the second light guide portion back surface 62b, and travels to the rear side at which the light exit portion 63 is located.

Of the light having reached the portion at which the light exit portion 63 is formed, light having reached the second surface 72 of each of the protrusions 73 formed on the front surface 6a at an incident angle smaller than the critical angle exits from the second surface 72 toward the interior of the accommodation chamber 2. Here, since the internal angle θ2 of the second surface 72 is set to be from 90 degrees to 50 degrees, the light exiting from the second surface 72 can be directed toward the rear side of the accommodation chamber 2 without causing the protrusions 73 to protrude to a height that impairs ease of cleaning.

On the other hand, the light having reached the second surface 72 at an incident angle smaller than the critical angle is reflected by the second surface 72, and reaches the back surface 6b. The light having reached the back surface 6b is diffused and reflected by each of the recesses 74 of the light reflection diffusion portion 65, and travels toward the front surface 6a once again. Then, when the light has satisfied the condition described above, the light exits from the second surface 72 toward the interior of the accommodation chamber 2. When the light has not satisfied the condition, the light returns to the back surface 6b once again, is diffused and reflected once again, and travels toward the front surface 6a. Here, since the plurality of protrusions 73 are provided, a plurality of light beams can be made to exit toward the rear side of the accommodation chamber 2.

The light having reached the rear end portion 6r without exiting from the light exit portion 63 to the accommodation chamber 2 exits from the light exit surface 75 of the end portion light exit shape 64 provided at the rear end portion 6r, toward the rear side of the accommodation chamber 2. Since the light exit surface 75 faces downstream in the travel direction of the light traveling from the front to the rear, the light exiting from the light exit surface 75 travels toward the rear side, and can effectively illuminate the rear corner of the accommodation chamber 2.

Second Embodiment

Another embodiment of the present invention will be described below. Note that, for convenience of description, components having the same functions as those described in the above-described embodiment will be denoted by the same reference signs, and descriptions of those components will be omitted.

Figure 14:
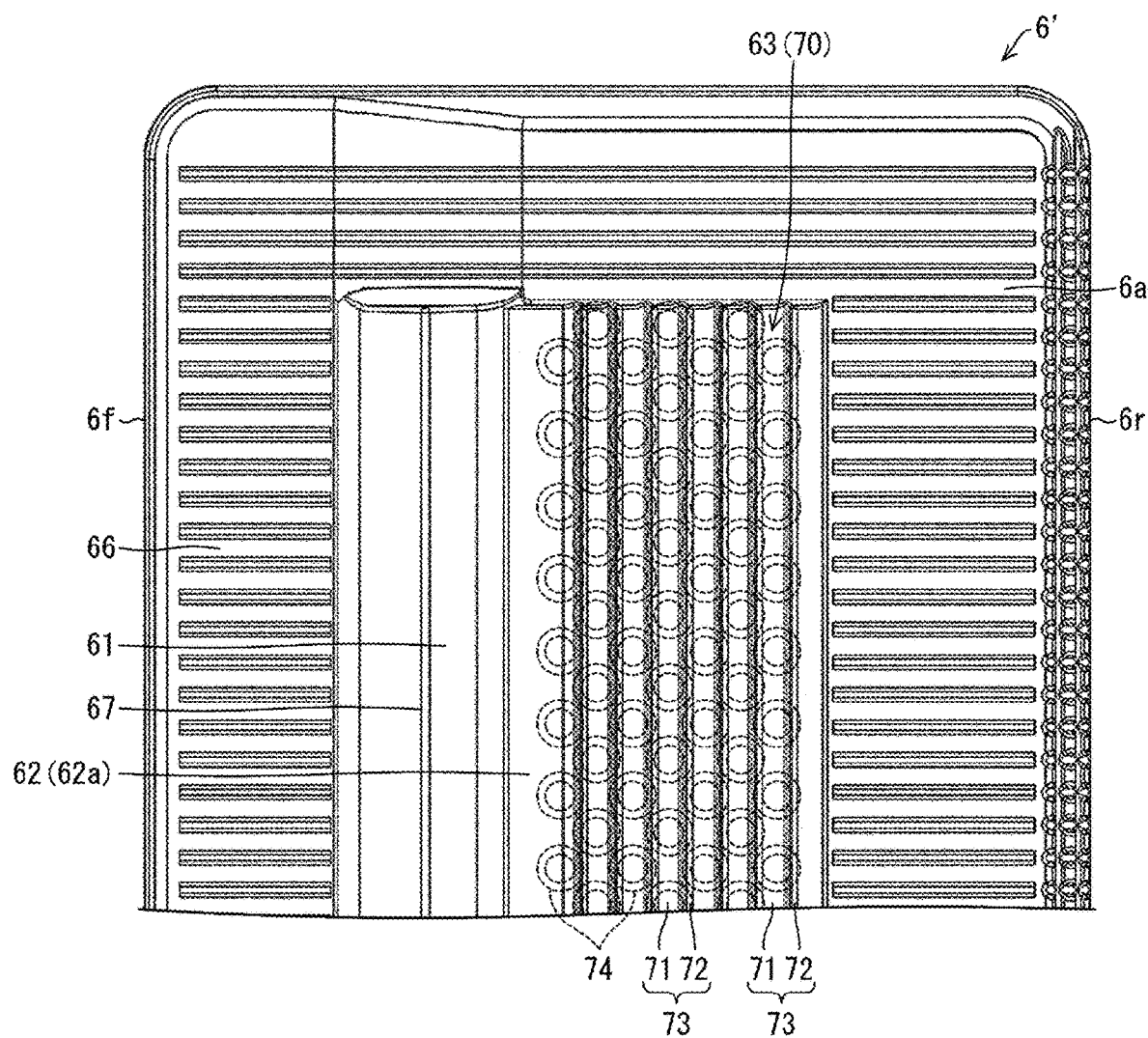
FIG. 14 is a front view illustrating main portions on the front surface side of a cover of a lighting device installed in an accommodation chamber of a refrigerator according to another embodiment.

FIG. 14 is a front view illustrating main portions of the front surface 6a side of a cover 6' of a lighting device installed in an accommodation chamber of a refrigerator according to another embodiment. As illustrated in FIG. 14, at the cover 6', the plurality of recesses 74 of the light reflection diffusion portion 65 provided on the back surface 6b are arranged corresponding to the plurality of protrusions 73 of the light exit portion 63 provided on the front surface 6a. Only this point is different from the cover 6.

Specifically, as illustrated in FIG. 14, the plurality of recesses 74 are arranged side by side in a line, corresponding to each of the plurality of protrusions 73 extending in a line. The rear side (rear end portion 6r side) of the inner peripheral surface of each recess 74 is located on the back side of the second surface 72 of the corresponding protrusion 73, and a bottom portion of a recessed portion of each recess 74 is located on the rear side of the first surface 71 of the corresponding protrusion 73.

With such a configuration, at each of the protrusions 73, light diffusion and reflection effects achieved by the plurality of recesses 74 can be made uniform. As a result, in the direction along which the protrusions 73 are arranged, unevenness in the brightness caused by a difference in the positional relationship with the plurality of recesses 74 can be suppressed.

Further, in the example illustrated in FIG. 14, by arranging the plurality of recesses 74 in a staggered manner, the front side (front end portion 6f side) of the inner peripheral surface of the recess 74 can be located on the back side of the second surface 72 of the protrusion 73 adjacent to the front side of the corresponding protrusion 73.

Supplement

A lighting device 10 according to a first aspect of the present invention is a lighting device provided on a wall surface (side wall 8) in an interior of a storage compartment (refrigerator 1), and includes a light source 3 configured to generate light, and a cover 6 including a light incident portion 60 on which the light generated by the light source 3 is incident. A plurality of recesses 74 are formed at a back surface 6b facing the light source 3 side of the cover 6.

With respect to the first aspect described above, in a lighting device 10 according to a second aspect of the present invention, the cover 6 includes a light exit portion 63 at a front surface 6a facing the interior of the storage compartment, the light exit portion 63 being configured to cause the light incident from the light incident portion 60 to exit to the interior of the storage compartment. The plurality of recesses 74 are located on the back side of the light exit portion 63.

With respect to the first aspect or the second aspect described above, in a lighting device 10 according to a third aspect of the present invention, each of the recesses 74 of the plurality of recesses 74 has an inner peripheral surface formed as a curved surface.

With respect to the third aspect described above, in a lighting device 10 according to a fourth aspect of the present invention, each of the recesses 74 of the plurality of recesses 74 is circular when viewed from the back surface 6b.

With respect to the fourth aspect described above, in a lighting device 10 according to a fifth aspect of the present invention, each of the recesses 74 of the plurality of recesses 74 has a hemispherical shape.

With respect to any one of the first to fifth aspects described above, in a lighting device 10 according to a sixth aspect of the present invention, the plurality of recesses 74 include the recesses 74 having mutually different sizes.

With respect to any one of the first to sixth aspects described above, in a lighting device 10 according to a seventh aspect of the present invention, the plurality of recesses 74 include the recesses 74 having mutually different depths.

With respect to the seventh aspect described above, in a lighting device 10 according to an eighth aspect of the present invention, the back surface 6b approaches the front surface 6a facing the interior of the storage compartment further downstream in a travel direction of light of a first direction along the wall surface.

With respect to any one of the first to eight aspects described above, in a lighting device 10 according to a ninth aspect of the present invention, the recesses 74 of the plurality of recesses 74 are arranged in a staggered manner with respect to each other.

With respect to the ninth aspect described above, in a lighting device 10 according to a tenth aspect of the present invention, an edge-to-edge distance between adjacent recesses 74, of the plurality of recesses 74, is equal to or less than the diameter of each of the recesses 74.

With respect to the second aspect described above, in a lighting device 10 according to an eleventh aspect of the present invention, the light exit portion 63 includes a plurality of protrusions 73 respectively provided in a line extending in a direction intersecting the first direction along the wall surface, and the plurality of recesses 74 are arranged corresponding to the plurality of protrusions 73.

With respect to the second aspect or eleventh aspect described above, in a lighting device 10 according to a twelfth aspect of the present invention, the cover 6 includes a first light guide portion 61 that changes, to a first direction along the wall surface, a travel direction of light incident from the light incident portion 60, and the light exit portion 63 is located downstream of the first light guide portion 61 in the travel direction of the light of the first direction.

With respect to the twelfth aspect described above, in a lighting device 10 according to a thirteenth aspect of the present invention, the cover 6 further includes a second light guide portion 62 located between the first light guide portion 61 and the light exit portion 63, and guiding light from the first light guide portion 61 to the light exit portion 63, and the plurality of recesses 74 are also formed at an end portion, on a side of the light exit portion 63, of the second light guide portion 62.

A storage compartment according to a fourteenth aspect of the present invention includes a lighting device according to any one of the first to thirteenth aspects described above.

A cover 6 according to a fifteenth aspect of the present invention is provided in an interior of a storage compartment and includes a light incident portion 60 on which light generated by the light source 3 is incident. A plurality of recesses 74 are formed at a back surface 6b facing a side of the light source 3.

Note that the present disclosure includes a technical idea deriving from a focus on the hollow structure of the hair of the polar bear. Furthermore, the present disclosure includes a technical idea deriving from a focus on the shape of the comb plate of the comb jellyfish. In other words, the present disclosure relates to biomimetics.

The present invention is not limited to each of the above-described embodiments. It is possible to make various modifications within the scope of the claims. An embodiment obtained by appropriately combining technical elements disclosed in different embodiments falls also within the technical scope of the present invention. Further, technical elements disclosed in the respective embodiments may be combined to provide a new technical feature.

REFERENCE SIGNS LIST

1 Refrigerator (storage compartment)
2 Accommodation chamber
3 Light source
3a LED
6, 6' Cover
6a Front surface
6b Back surface
6f Front end portion
6r Rear end portion
8 Side wall (wall surface)
10 Lighting device
60 Light incident portion
61 First light guide portion
62 Second light guide portion
62a Second light guide portion front surface
62b Second light guide portion back surface
63 Light exit portion
64 End portion light exit shape
65 Light reflection diffusion portion
70 Protruding portion
73 Protrusion
74 Recess
75 Light exit surface
76 Rectangular block shape
L1, L2 Line segment
θ1, θ2 Internal angle
θ3 Angle

The invention claimed is:

1. A cover provided in an interior of a storage compartment and including a light incident portion on which light emitted by a light source is incident, the cover comprising:
   a light exit portion including a protrusion formed on a front surface facing the interior of the storage compartment, the light exit portion being configured to cause the light to exit to the interior of the storage compartment; and
   a light reflection diffusion portion formed on a back side of the light exit portion at a back surface facing a side of the light source, the light reflection diffusion portion including a plurality of recesses, each of the plurality of recesses having an inner peripheral surface and being configured to direct the light toward the protrusion,
   wherein the light reflection diffusion portion further includes, in a region of the back surface in which the plurality of recesses are formed, an inclined portion that approaches the front surface further downstream in a travel direction of the light.

2. A cover provided in an interior of a storage compartment and including a light incident portion on which light emitted by a light source is incident, the cover comprising:
- a light exit portion including a protrusion formed on a front surface facing the interior of the storage compartment, the light exit portion being configured to cause the light to exit to the interior of the storage compartment; and
- a light reflection diffusion portion formed on a back side of the light exit portion at a back surface facing a side of the light source, the light reflection diffusion portion including a plurality of recesses, each of the plurality of recesses having an inner peripheral surface and being configured to direct the light toward the protrusion,
- wherein the plurality of recesses includes a first recess and a second recess, the second recess is provided further downstream than the first recess in a travel direction of the light, and the second recess has a depth shallower than a depth of the first recess.

3. A cover provided in an interior of a storage compartment and including a light incident portion on which light emitted by a light source is incident, the cover comprising:
- a light exit portion formed on a front surface facing the interior of the storage compartment, the light exit portion being constituted by a plurality of protrusions and areas between the plurality of protrusions, the light exit portion being configured to cause the light to exit to the interior of the storage compartment; and
- a light reflection diffusion portion formed on a back side of the light exit portion at a back surface facing a side of the light source, the light reflection diffusion portion being constituted by a plurality of recesses and areas between the plurality of recesses, each of the plurality of recesses having an inner peripheral surface, and the light reflection diffusion portion being configured to direct the light toward the plurality of protrusions,
- wherein a protrusion of the plurality of protrusions, which is located closest to the light source, is located downstream in a travel direction of the light with respect to a recess of the plurality of recesses, which is located closest to the light source.

4. The cover according to claim 3,
wherein at least one of the plurality of recesses is provided closer to the light incident portion than to the light exit portion in a travel direction of the light from the light source.

5. The cover according to claim 3,
wherein the light reflection diffusion portion includes, in a region of the back surface in which the plurality of recesses are formed, an inclined portion that approaches the front surface further downstream in a travel direction of the light.

6. The cover according to claim 3,
wherein the plurality of recesses includes a first recess and a second recess, the second recess is provided further downstream than the first recess in a travel direction of the light, and the second recess has a depth shallower than a depth of the first recess.

7. The cover according to claim 3,
wherein the plurality of protrusions are provided in parallel, each of the plurality of protrusions has a line shape, and
for each of the plurality of protrusions, a plurality of recesses from among the plurality of recesses are provided in a line along said each of the plurality of protrusions.

8. The cover according to claim 7,
wherein along a travel direction of the light, each of the plurality of protrusions has a first surface and a second surface, the second surface has a larger internal angle formed with a plane parallel to a plane on which the plurality of protrusions are formed than the first surface has, and
a bottom portion of a recessed portion of each of the plurality of recesses is located on a back side of the first surface of a corresponding protrusion.

9. The cover according to claim 3,
wherein the plurality of recesses are arranged in a staggered manner with respect to each other.

10. The cover according to claim 3, further comprising a first light guide portion that changes, to a first direction, a travel direction of the light incident from the light incident portion, wherein
the light exit portion is located downstream of the first light guide portion in the first direction.

11. The cover according to claim 10, further comprising a second light guide portion located between the first light guide portion and the light exit portion, and configured to guide light from the first light guide portion to the light exit portion, wherein
the plurality of recesses are also formed at an end portion, on a side of the light exit portion, of the second light guide portion.

12. A storage compartment comprising, on an inner wall surface, a lighting device including the cover according to claim 3 and a light source that emits light.

* * * * *